Figure 2:
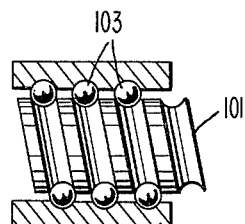

United States Patent [19]

Burckhardt

[11] B 4,003,404
[45] Jan. 18, 1977

[54] SERVO STEERING SYSTEM FOR VEHICLES, ESPECIALLY MOTOR VEHICLES

[75] Inventor: Manfred H. Burckhardt, Waiblingen, Germany

[73] Assignee: Daimler-Benz Aktiengesellschaft, Germany

[22] Filed: Jan. 11, 1974

[21] Appl. No.: 432,594

[44] Published under the second Trial Voluntary Protest Program on March 30, 1976 as document No. B 432,594.

[30] Foreign Application Priority Data

Jan. 12, 1973  Germany .......................... 2301415

[52] U.S. Cl. ............................... 137/627.5; 91/433; 180/132
[51] Int. Cl.² .......................................... B62D 5/08
[58] Field of Search .......... 91/433, 434; 137/627.5; 180/79.2 R

[56] References Cited

UNITED STATES PATENTS

| | | | |
|---|---|---|---|
| 2,954,837 | 10/1960 | Ziskal | 180/79.2 R |
| 3,414,073 | 12/1968 | Hurwitz | 180/79.2 R |
| 3,428,143 | 2/1969 | King et al. | 180/79.2 R |

FOREIGN PATENTS OR APPLICATIONS

| | | | |
|---|---|---|---|
| 1,025,281 | 2/1958 | Germany | 180/79.2 R |
| 1,214,554 | 1/1964 | Germany | 180/79.2 R |
| 833,611 | 4/1960 | United Kingdom | 91/434 |

*Primary Examiner* — Robert G. Nilson
*Attorney, Agent, or Firm* — Craig & Antonelli

[57] ABSTRACT

A servo-steering system for vehicles, especially for motor vehicles, in which the steering lever is displaced by means of a steering nut movable on a steering spindle, and in which adjusting devices are coordinated to the steering nut which are acted upon by a pressure medium whose pressure is controllable by means of control elements as a function of the deflection of the steering nut; a high pressure accumulator thereby serves as pressure medium source whereby the inflow of the pressure medium to the spaces containing the working pressure at the control element is completely interrupted in the normal rest position of the steering nut.

12 Claims, 2 Drawing Figures

SERVO STEERING SYSTEM FOR VEHICLES, ESPECIALLY MOTOR VEHICLES

The present invention relates to a servo-steering system for vehicles, especially for motor vehicles, in which the steering lever is adjusted by means of a steering nut movable on a steering spindle, possibly by interposition of circulating balls, and in which adjusting members are coordinated to the steering nut which are actuated by a pressure medium whose pressure is controllable by means of a control element in dependence on the deflection of the steering nut.

The known servo-steering systems of the aforementioned type require considerable pressure medium quantities for a completely satisfactory functioning so that a separate pump with special characteristics is required. Additionally, a feed which is as free as possible from oscillations must be insisted upon which again makes necessary special expenditures for the damping of these pressure medium oscillations.

The present invention is concerned with the task to avoid the aforementioned disadvantages. Consequently, the structural expenditure for a servo-steering system is to be reduced, and a completely satisfactory operation of the servo-steering system, free of oscillations, is to be attained. The underlying problems are solved according to the present invention with the servo-steering systems of the aforementioned type in that a high pressure accumulator or storage device serves as pressure medium source and in that the feed of the pressure medium to the spaces conducting the working pressure at the control element is completely interrupted in the center position of the steering nut.

In the servo-steering system constructed according to the present invention, to start with, a separate pump becomes superfluous therefor, i.e., the structural expenditures are considerably reduced. Also, the elimination of any oscillation damping means for the pressure medium or at least a very considerable simplification contributes to the simplification and reduction in cost of the overall installation. Additionally, the advantageous possibility results from the proposal of the present invention to also integrate the servo-steering system into a so-called central hydraulic system, i.e., to control from a common accumulator or storage device both the servo-steering system as well as the energy-storage (servo) brakes and other pressure medium actuated devices.

In one embodiment according to the present invention, the steering nut engages by means of a pin into a guide sleeve which is disposed in the bore of the control part between the two control pistons and whose centrally arranged valve-closure-plates have a slight spacing from the end faces of the two control pistons forming the valve seats. It is thereby additionally proposed that one control sleeve each is fixedly arranged in the bore of the control part on both sides of the guide sleeves which accommodates centrally the control piston and at an end face thereof the feed or inlet valve to the space conducting the working pressure.

It is proposed by the present invention for the construction of this inlet valve that several identical, axially parallel through-bores are arranged in each control sleeve which are distributed uniformly over the circumference and are connected with the feed or supply from the accumulator or storage device and in that these bores are closed off in the direction toward the working space by ball valves and receive compensating pistons in the direction toward the guide sleeve, and in that both the balls as well as the compensating pistons are again supported at abutments which are fixedly arranged on the control piston. In that connection, a main spring is then arranged according to the present invention at each control piston between the control sleeve and the abutment supporting the compensating pistons. This main spring supplies the closure force for the inlet valve, i.e., for the several balls arranged in a control sleeve. The number of the ball valves itself is not important in principle; one will normally choose about 3–6 ball valves.

A further proposal of the present invention resides in that each control piston passes over at its end opposite the guide sleeve into a compensating or equalizing sleeve which receives a conventional reaction piston. It is then proposed in detail that for the purpose of actuation of the reaction piston the space disposed in the compensating sleeve is in communication with the working space by way of a cross bore provided in the compensating sleeve and in that the reaction piston is springily supported against the housing. The characteristics of the control can be changed by the selection of the diameters of the compensating sleeve, of the control pistons and of the reaction pistons.

By the use of a pressure medium accumulator or storage device for a servo-steering system, as proposed by the present invention, and by the correspondingly proposed construction of the control parts thereof, on the one hand, the construction of the steering devices as such and, on the other, the construction of the accumulator are not affected. This means, these parts may therefore be constructed in any suitable, conventional manner.

Accordingly, it is an object of the present invention to provide an auxiliary-force steering system for vehicles, especially for motor vehicles, which avoids by simple means the aforementioned shortcomings and drawbacks encountered in the prior art.

Another object of the present invention resides in a servo-steering system which does not require a separate pump with special characteristics for a completely satisfactory operation of the servo-steering system.

A further object of the present invention resides in a servo-steering system for vehicles, especially motor vehicles, which is relatively simple in construction and which permits a significant reduction in expenditures as regards manufacture and assembly.

A still further object of the present invention resides in a servo-steering system for motor vehicles which assures a completely satisfactory operation notwithstanding the fact that it entails significant savings in manufacture and assembly.

Another object of the present invention resides in a servo-steering system which can be readily integrated into a central hydraulic system of the motor vehicle.

Figure 1:
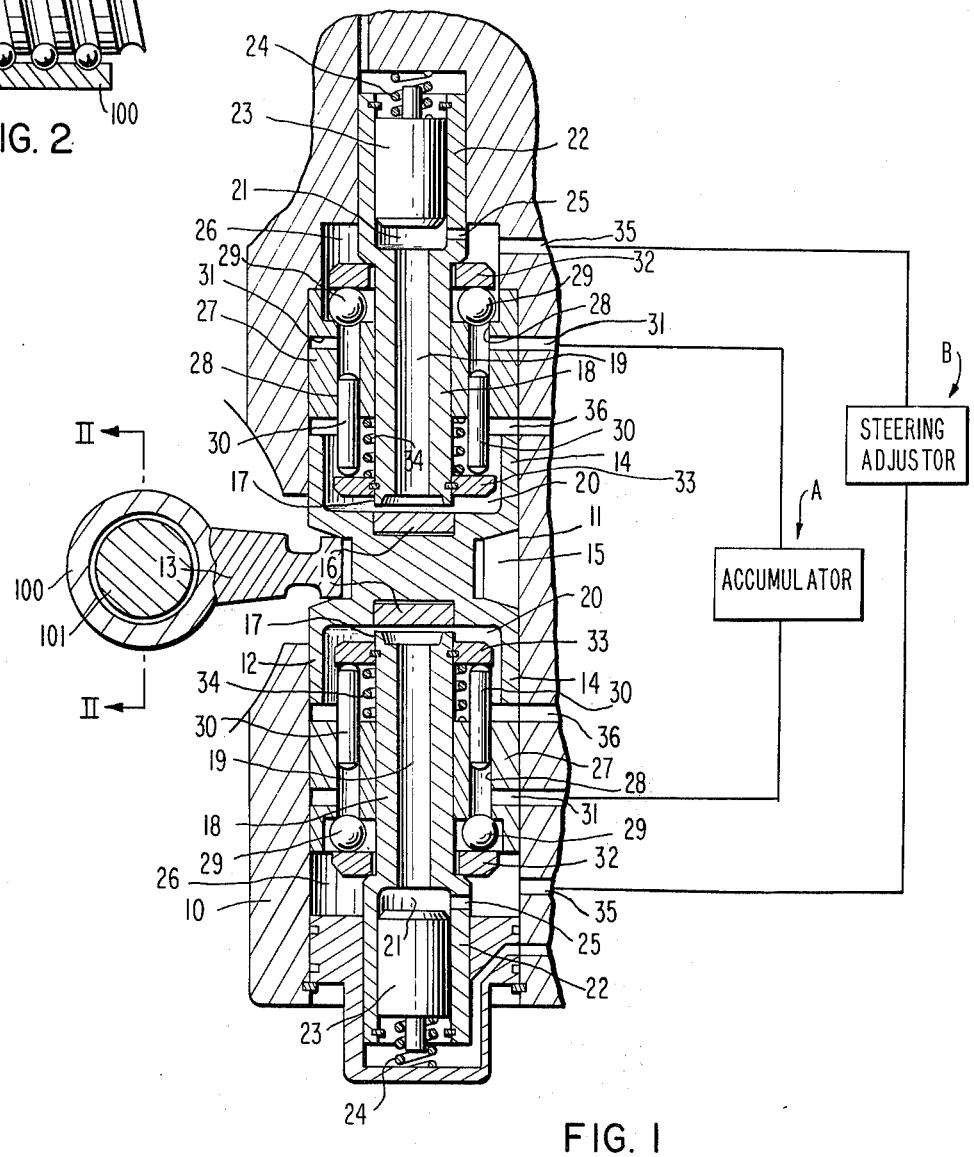

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through the control part of a servo-steering system in accordance with the present invention; and FIG. 2 is a partial cross sectional view taken along lines II—II of FIG. 1.

Referring now to the single figure of the drawing, a longitudinal bore 11 for the accommodation of the control part is provided in the housing 10 of the servo-control device according to the present invention. A guide sleeve 12 is arranged in this longitudinal bore 11 approximately in the center thereof, into which engages the steering nut 100 by means of a finger 13 thereof. The guide sleeve 12 seals the longitudinal bore 11 in the direction toward the annular space 15 by means of its pot-shaped parts 14 which are symmetrically disposed mirror-image-like to one another, and therewith seals the bore 11 with respect to the steering nut housing. In its center portion, the guide sleeve 12 accommodates one valve plate 16 each on both sides thereof which forms the closure body for the two discharge valves, whereby the valve seats 17 for the valve plates 16 are disposed at the end faces of a respective control piston 18 which are also arranged mirror-image-like to one another on both sides of the guide sleeve 12. The construction is in principle the same on both sides so that only one side will be described in detail hereinafter.

The control piston 18 is provided with a central bore 19 which connects the space 20 between the guide sleeve 12 and the control piston 18, which is connected with discharge, i.e., is relieved to zero pressure by way of bore 36, with the space 21. The control piston 18 is enlarged at its end opposite the guide sleeve 12 into a compensating sleeve 22 of larger diameter which is guided in the housing 10. This compensating sleeve 22 accommodates the reaction piston 23 which is acted upon by the pressure in the space 21 and which is supported against the housing 10 by a spring 24. The space 21 is connected with the space 26 conducting the working pressure of the steering system by way of a cross bore 25.

The control piston 18 is slidingly supported in a control sleeve 27 which is fixedly inserted into the housing 10. This control sleeve 27 accommodates the inlet or inflow 31 from the accumulator generally designated by the reference character A. It is provided with several longitudinal bores 28 uniformly distributed over the circumference which, on the one hand, are closed off by valve-balls 29 and in which, on the other, are arranged compensating pistons 30. The inlet line 31 terminates between the valve balls 29 and the compensating pistons 30 so that the balls 29 and the compensating pistons 30 are pressed apart by the pressure. Both of these parts 29 and 30 are supported on a respective abutment 32 and 33 which are fixedly arranged on the control piston 18. As a result thereof, the forces stemming from the inflow or inlet pressure are compensated for at the control piston 18. The balls 29 act as inlet valves. The main spring 34 which is disposed between the control sleeve 27 and the abutment 33, thereby presses the balls 29 securely against their valve seat. Lines 35 lead from the working spaces 26 to the corresponding adjusting devices generally designated by the reference character B of the steering system which are of known construction and operation.

In the illustrated center position, all inlet valves are closed, i.e., the balls 29 are forced securely against their seat. The discharge valves formed by elements 16, 17 are open and the spaces 20 are relieved to zero pressure by way of the lines 36. If the steering nut 100 now moves, for example, in the counterclockwise direction, then the guide sleeve 12 is displaced upwardly by the finger 13, until after a very small clearance it closes the discharge valve by means of the valve plate 16 and during further movement slightly lifts the control piston 18 in the upward direction, as viewed in the drawing. As a result thereof, the balls 29 are lifted off from their valve seat, and a pressure now builds up in the upper working space 26 which is conducted by way of the line 35 to the corresponding side of the adjusting devices. A corresponding pressure also builds up in the space 21 underneath the reaction piston 23. The reaction force now pushes the finger 13 of the steering system again back in a known manner until the inlet valves 29 can close.

As shown in FIG. 2 the steering nut 100 is movably mounted on the steering spindle 101 by the interposition of circulating balls 103 in a known manner.

The illustrated servo-steering system entails no oil consumption whatsoever in the normal rest position. It is therefore completely suited for the operation with an accumulator or storage device. The present invention thereby contemplates primarily a high pressure accumulator or energy storage device whose working pressure lies between 150 and 200 psi. A further advantage of the proposal according to the present invention resides in that, with a standstill or stoppage of the engine during the drive or during the parking, the servo-effect does not disappear immediately but one is able to continue to steer with servo-assist until the accumulator is empty. Additionally, relatively stronger steering movements are possible during engine idling without the fact that the engine is depressed thereby due to the load and eventually stalls. The pump required for charging the accumulator or storage device usable in the present invention requires only a relatively small output.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A servo-steering system for vehicles in which a steering nut is movable on a steering spindle, and in which adjusting means are coordinated to the steering nut which are acted upon by a pressure medium, whose pressure is controllable by a control means in dependence on the deflection of the steering nut, characterized in that a high pressure accumulator means serves as pressure medium source, said control means being provided with space means conducting the working pressure, the inflow of the pressure medium to said space means being substantially completely interrupted by said control means in the normal position of the steering nut, the steering nut engages with a finger into a guide sleeve means which is located in a bore provided in a portion of the control means between two control piston means, and valve closure plate means in said guide sleeve means which are spaced at a slight distance from the end faces of the control piston means forming valve seats for the valve closure plate means, one control sleeve means each is fixedly arranged in the bore of the portion of said control means on both sides of the guide sleeve means, said control sleeve means accommodating centrally thereof the control piston means and at the end face thereof an inlet valve means leading to said space means conducting the working pressure, several similar axially parallel bores are provided in each control sleeve means, which are connected with the inlet from the accumulator means, said last-mentioned bores being closed in the direction toward the working space means by first valve means and receiving compensating piston means in the direction toward the guide sleeve means, and at least the compensating piston means being supported at abutment means fixedly arranged on the control piston means.

2. A servo-steering system according to claim 1, characterized in that the valve closure plate means are centrally arranged in said guide sleeve means.

3. A servo-steering system according to claim 1, characterized in that a main spring is arranged at each control piston means between the respective control sleeve means and the abutment means supporting the compensating piston means.

4. A servo-steering system according to claim 3, characterized in that each control piston means passes over at its end opposite the guide sleeve means into a compensating sleeve means which receives a reaction piston means.

5. A servo-steering system according to claim 4, characterized in that said compensating sleeve means is provided with a space which for actuating the reaction piston means, is in communication by way of a cross bore provided in the compensating sleeve means with the working space means, and the reaction piston means being springily supported against the housing of the control means.

6. A servo-steering system according to claim 1, wherein said first valve means are ball valves which are also supported at abutment means fixedly arranged on the control piston means.

7. A servo-steering system for vehicles, in which a steering nut is movable on a steering spindle, and in which adjusting means are coordinated to the steering nut which are acted upon by a pressure medium, whose pressure is controllable by a control means in dependence on the deflection of the steering nut, characterized in that a high pressure accumulator means serves as pressure medium source, said control means being provided with space means conducting the working pressure, the inflow of the pressure medium to said space means being substantially completely interrupted by said control means in the normal position of the steering nut, the steering nut engages with a finger into a guide sleeve means which is located in a bore provided in a portion of the control means between two control piston means, one control sleeve means each is fixedly arranged in the bore of the portion of said control means on both sides of the guide sleeve means said control sleeve means accommodating centrally thereof the control piston means and at the end face thereof an inlet valve means leading to said space means conducting the working pressure, several similar axially parallel bores are provided in each control sleeve means, which are connected with the inlet from the accumulator means, said last-mentioned bores being closed in the direction toward the working space means by first valve means and receiving compensating piston means in the direction toward the guide sleeve means, and at least the compensating piston means being supported at abutment means fixedly arranged on the control piston means.

8. A servo-steering system according to claim 7, characterized in that said steering nut is movably mounted on the steering spindle by interposition of circulating balls.

9. A servo-steering system according to claim 7, characterized in that a main spring is arranged at each control piston means between the respective control sleeve means and the abutment means supporting the compensating piston means.

10. A servo-steering system according to claim 7, characterized in that each control piston means passes over at its end opposite the guide sleeve means into a compensating sleeve means which receives a reaction piston means.

11. A servo-steering system according to claim 10, characterized in that said compensating sleeve means is provided with a space which, for actuating the reaction piston means, is in communication by way of a cross bore provided in the compensating sleeve means with the working space means, and the reaction piston means being springily supported against the housing of the control means.

12. A servo-steering system according to claim 7, wherein said first valve means are ball valves which are also supported at abutment means fixedly arranged on the control piston means.

* * * * *